US008452635B2

(12) United States Patent
Caron et al.

(10) Patent No.: US 8,452,635 B2
(45) Date of Patent: May 28, 2013

(54) TECHNIQUES FOR ESTIMATING SALES OF ITEMS THROUGH A PARTICULAR CHANNEL

(75) Inventors: Jerome Caron, Montreal (CA); Pierre St-Martin, Saint-Lambert (CA); Carlos Rios, Kirkland (CA); Lino Pirollo, Lachine (CA)

(73) Assignee: IMS Software Services Ltd., Plymouth, PA (US)

( * ) Notice: Subject to any disclaimer, the term of this patent is extended or adjusted under 35 U.S.C. 154(b) by 1962 days.

(21) Appl. No.: 10/928,840

(22) Filed: Aug. 27, 2004

(65) Prior Publication Data

US 2006/0122888 A1   Jun. 8, 2006

Related U.S. Application Data

(60) Provisional application No. 60/500,423, filed on Sep. 5, 2003.

(51) Int. Cl.
G06Q 30/00 (2006.01)

(52) U.S. Cl.
USPC .................................. 705/7.29; 705/2

(58) Field of Classification Search
USPC .................................. 705/7.29, 2
See application file for complete search history.

(56) References Cited

U.S. PATENT DOCUMENTS

| | | | |
|---|---|---|---|
| 5,323,941 A | 6/1994 | Sobolev | |
| 5,420,786 A * | 5/1995 | Felthauser et al. | 705/2 |
| 5,446,890 A * | 8/1995 | Renslo et al. | 707/104.1 |
| 5,492,430 A | 2/1996 | Jones | |
| 5,749,386 A | 5/1998 | Samuel, Jr. | |
| 5,892,900 A * | 4/1999 | Ginter et al. | 726/26 |
| 6,151,582 A * | 11/2000 | Huang et al. | 705/8 |
| 6,401,070 B1 * | 6/2002 | McManus et al. | 705/1 |
| 6,539,392 B1 * | 3/2003 | Rebane | 707/101 |
| 6,636,862 B2 * | 10/2003 | Lundahl et al. | 707/101 |
| 7,027,999 B2 * | 4/2006 | Smith et al. | 705/10 |
| 7,072,848 B2 * | 7/2006 | Boyd et al. | 705/10 |
| 7,120,596 B2 * | 10/2006 | Hoffman et al. | 705/28 |
| 7,171,379 B2 * | 1/2007 | Menninger et al. | 705/28 |
| 7,174,304 B1 * | 2/2007 | Boardman | 705/10 |
| 7,302,410 B1 * | 11/2007 | Venkatraman et al. | 705/35 |
| 7,319,972 B2 * | 1/2008 | von Gonten et al. | 705/10 |
| 7,324,987 B2 * | 1/2008 | Hsieh et al. | 707/3 |
| 7,437,307 B2 * | 10/2008 | Walsh et al. | 705/10 |
| 7,523,047 B1 * | 4/2009 | Neal et al. | 705/10 |
| 7,610,214 B1 * | 10/2009 | Dwarakanath et al. | 705/10 |
| 2001/0035202 A1 | 11/2001 | Moskowitz et al. | |
| 2002/0055882 A1 * | 5/2002 | Van Gorkum | 705/26 |
| 2002/0065699 A1 * | 5/2002 | Talluri | 705/8 |
| 2002/0116348 A1 * | 8/2002 | Phillips et al. | 705/400 |
| 2002/0147657 A1 * | 10/2002 | Callender et al. | 705/26 |

(Continued)

OTHER PUBLICATIONS

Carlin, T. and McMeen. A., Analyzing Financial Statements, (1993) American Bankers Association, 4th ed., p. 155.*

(Continued)

Primary Examiner — Andre Boyce
Assistant Examiner — Tiphany Dickerson
(74) Attorney, Agent, or Firm — Fish & Richardson P.C.

(57) ABSTRACT

In one arrangement, a method for estimating sales of a particular type of item by a first entity through a first channel versus sales of the particular type of item by the first entity through a second channel.

17 Claims, 10 Drawing Sheets

U.S. PATENT DOCUMENTS

| | | | |
|---|---|---|---|
| 2003/0014336 A1* | 1/2003 | Dao et al. | 705/30 |
| 2003/0018550 A1* | 1/2003 | Rotman et al. | 705/35 |
| 2003/0050823 A1* | 3/2003 | Gehman et al. | 705/10 |
| 2003/0130883 A1* | 7/2003 | Schroeder et al. | 705/10 |
| 2003/0130983 A1* | 7/2003 | Rebane | 707/1 |
| 2003/0195793 A1* | 10/2003 | Jain et al. | 705/10 |
| 2003/0229552 A1* | 12/2003 | Lebaric et al. | 705/35 |

OTHER PUBLICATIONS

Johannes, L. Competing Online, Drugstore Chains Virtually Undersell Themselves, (Jan. 10, 2000) Wall Street Journal p. B1.*

Lehmann, D. and Weinberg, C., Sales Through Sequential Distribution Channels: An Application to Movies and Videos, (Jul. 2000), Journal of Marketing, vol. 64, pp. 18-33.*

Doehrman, M., Canadian Online Pharmacy to Open Springs Storefront, (May 7, 2003) Colorado Springs Business Journal, p. 1.*

Johannes, L. Competing Online, Drugstore Chains Virtually Undersell Themselves, (Jan. 10, 2000) Wall Street Journal p. B1.*

Geyskens, I., Gielens, K., and Dekimpe, M., The Market Valuation of Internet Channel Additions, (Apr. 2002), Journal of Marketing, vol. 66, pp. 102-119.*

Kadiyali V., Chintagunta, P., and Vilacassim, N., Manufacturer—Retailer Channel Interactions and Implications for Channel Power: An Empirical Investigation of Pricing in a Local Market, (Spring, 2000), Marketing Science, vol. 19, No. 2, pp. 127-148.*

Lappin, J. et al., "A Primer on Consumer Marketing Research: Procedures, Methods and Tools" (1994), U.S. Department of Transportation Research and Special Programs Administration, accessed from: http://ntl.bts.gov/lib/16000/16600/16689/PB2000104499.pdf.*

Van Heerde, H., et al., "The Estimation of Pre- and Postpromotion Dips with Store-level Scanner Data" (2000), Journal of Marketing Research, vol. 37 Iss. 3, pp. 383-395.*

* cited by examiner

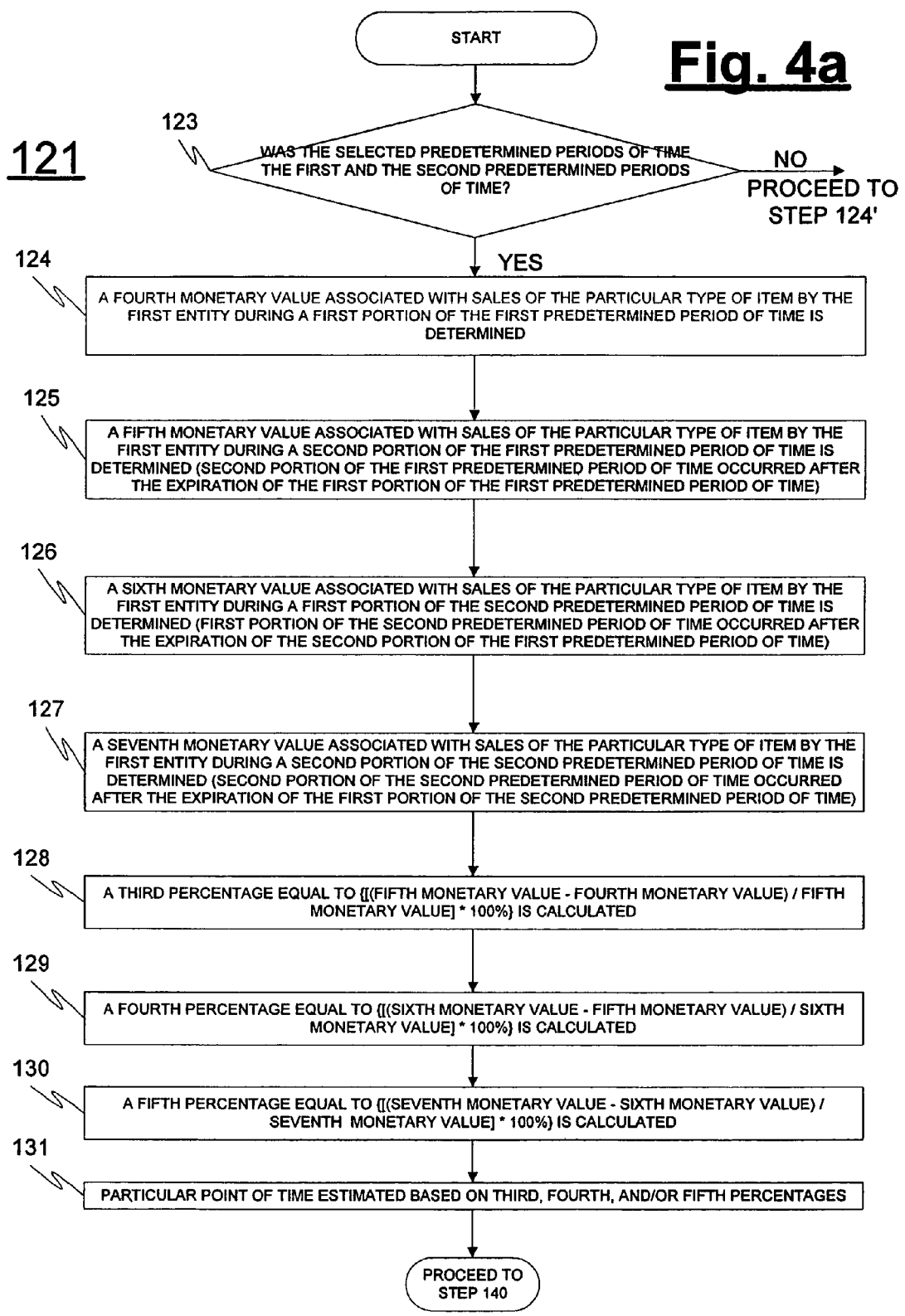

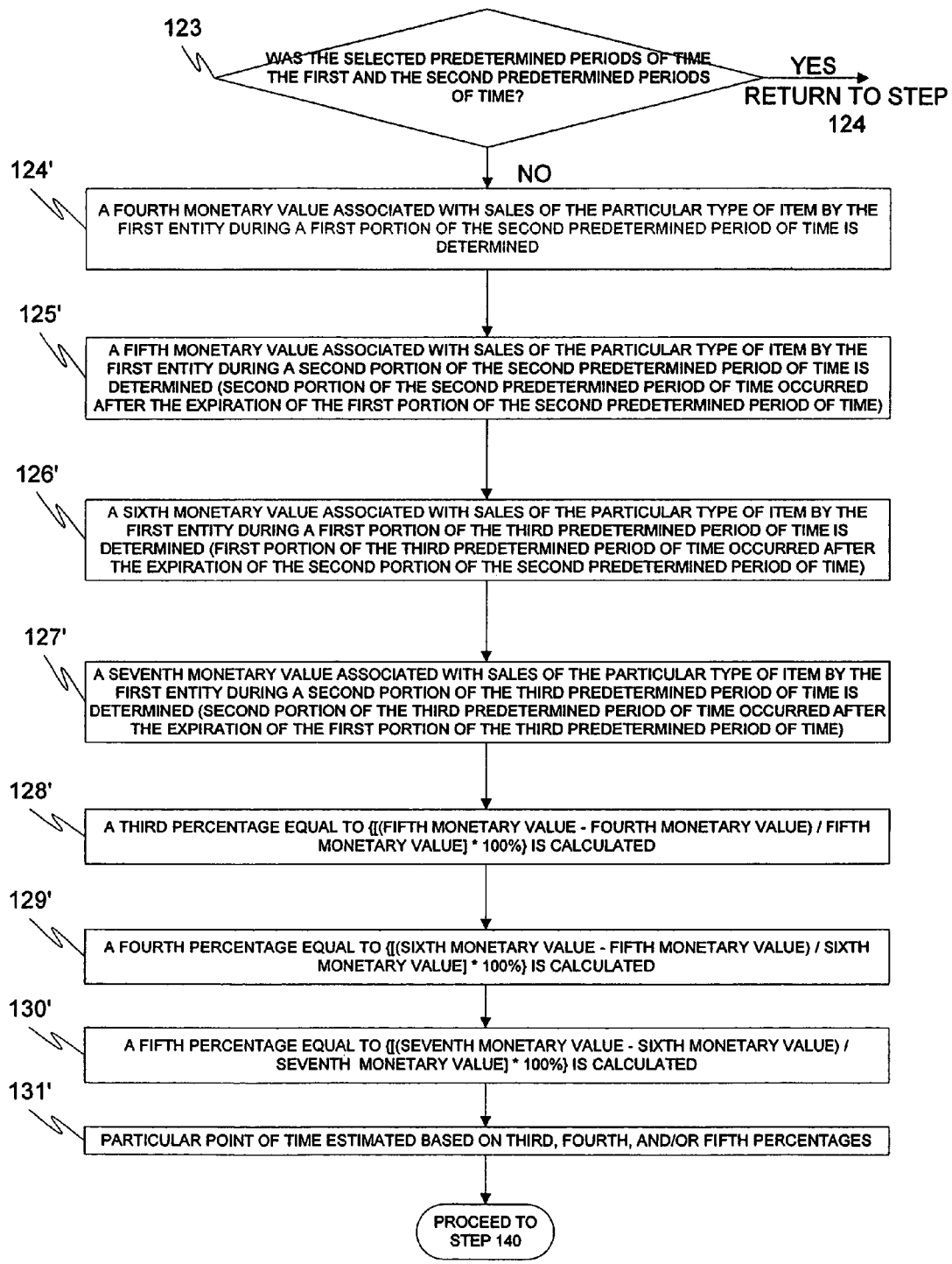

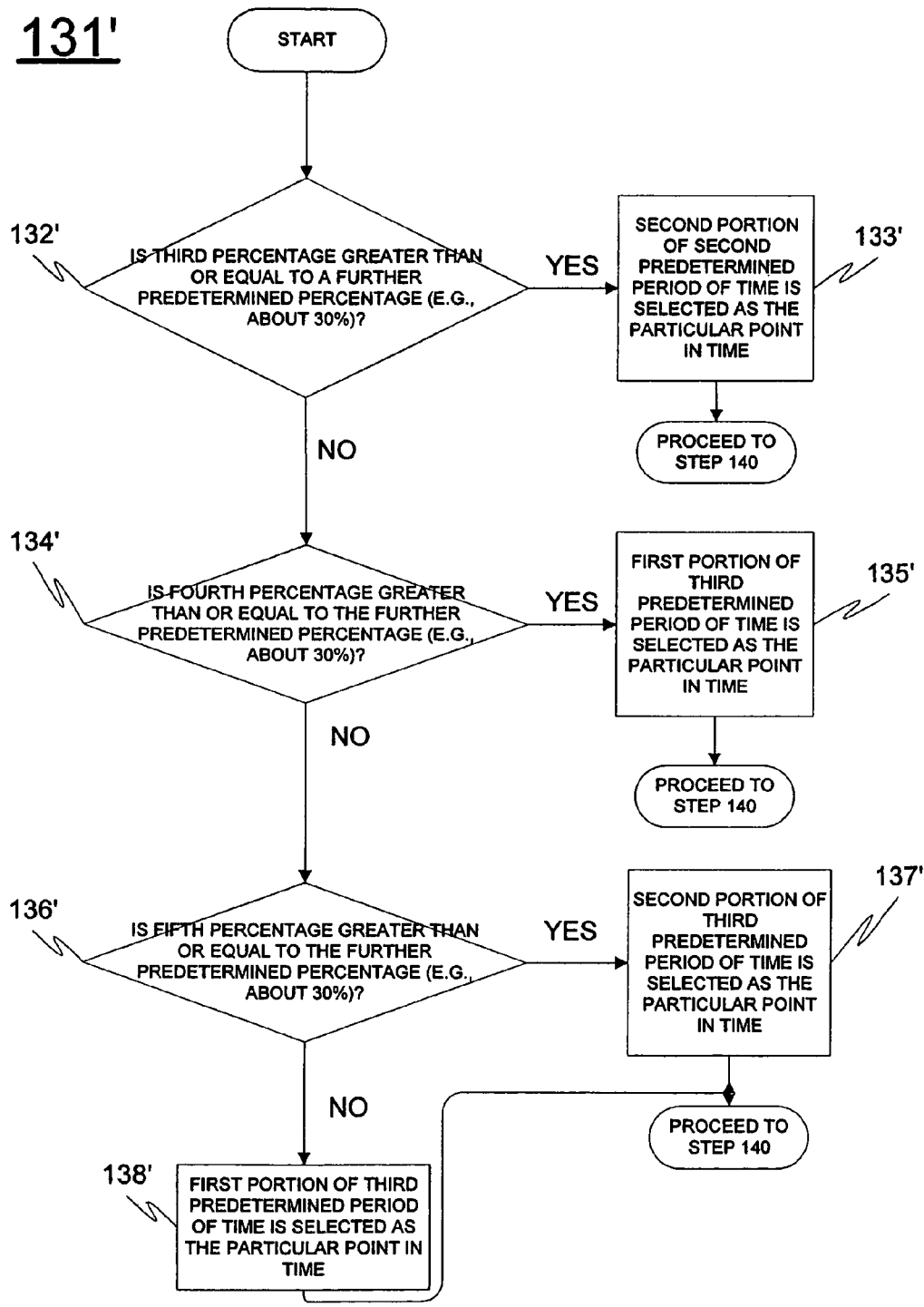

Fig. 6a

| MONTH | VALUE OF ITEM 1 SALES | VALUE OF ITEM 2 SALES | TOTAL SALES VALUE | PREDET-MINED PERIOD OF TIME | TOTAL AVERAGE SALES FOR PREDET-MINED PERIOD OF TIME | PERCENT DIFFERENCE BETWEEN CONCURRENT PERIODS OF TIME |
|---|---|---|---|---|---|---|
| DECEMBER | 100,000 | 98,000 | 198,000 | 4TH | 198,825 | 129.0% |
| NOVEMBER | 95,000 | 114,599 | 209,599 | 4TH | | |
| OCTOBER | 95,000 | 93,877 | 188,877 | 4TH | | |
| SEPTEMBER | 85,000 | 84,803 | 169,803 | 3RD | 86,832 | 369.4% |
| AUGUST | 34,566 | 37,124 | 71,693 | 3RD | | |
| JULY | 10,203 | 8,797 | 19,000 | 3RD | | |
| JUNE | 8,000 | 10,000 | 18,000 | 2ND | 18,500 | 8.8% |
| MAY | 7,893 | 11,607 | 19,500 | 2ND | | |
| APRIL | 8,165 | 9,835 | 18,000 | 2ND | | |
| MARCH | 8,256 | 10,744 | 19,000 | 1ST | 17,000 | |
| FEBRUARY | 7,500 | 7,500 | 15,000 | 1ST | | |
| JANUARY | 8,500 | 8,500 | 17,000 | 1ST | | |

Fig. 6b

| MONTH | PREDETERMINED PERIOD OF TIME | AVERAGE TOTAL SALES DURING THE MONTH | PERCENT DIFFERENCE BETWEEN CONCURRENT MONTHS |
|---|---|---|---|
| SEPTEMBER | 3RD | 169,803 | 57.8% |
| AUGUST | 3RD | 71,693 | 73.5% |
| JULY | 3RD | 19,000 | 5.3% |
| JUNE | 2ND | 18,000 | -8.3% |
| MAY | 2ND | 19,500 | 7.7% |
| APRIL | 2ND | 18,000 | |

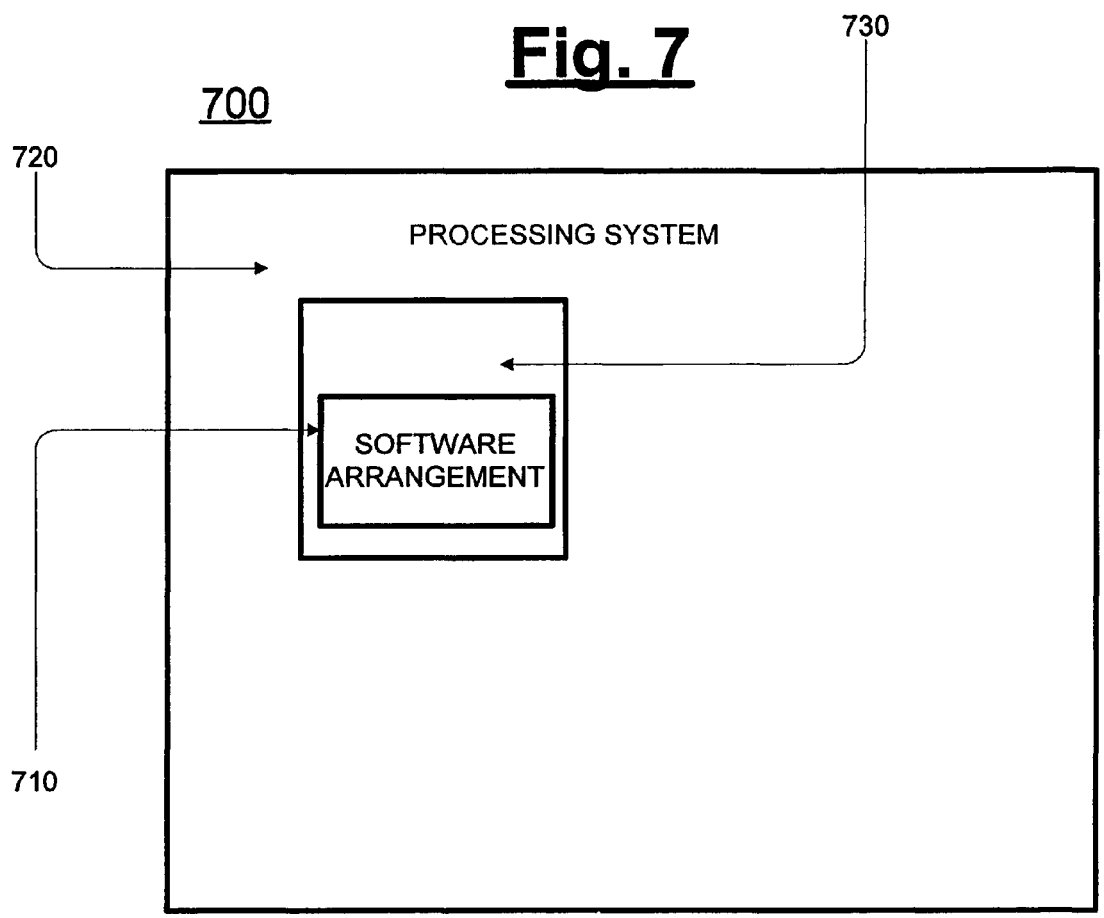

TECHNIQUES FOR ESTIMATING SALES OF ITEMS THROUGH A PARTICULAR CHANNEL

RELATED APPLICATIONS

This application claims priority from U.S. Provisional Application Ser. No. 60/500,423, entitled "Techniques for estimating sales of items through a particular channel", filed on Sep. 5, 2003, the disclosure of which is hereby incorporated in its entirety by reference.

FIELD OF THE INVENTION

The present invention relates generally to techniques for estimating sales of items through a first channel, and in particular, to such techniques in which a first entity sells the items through both the first channel and a second channel, a second entity sells the items through the second channel, and the percentage of the first entity's sales of the items which occur through the first channel is estimated based in part on the second entity's sales of the items through the second channel.

BACKGROUND OF THE INVENTION

Pharmaceutical companies often sell items, such as prescription drugs, to several different stores, such as pharmacies or prescription drug wholesalers, which then sell these items to customers/end users through selected channels. For example, some sales of the items to the customer may occur through the Internet, and some sales of the items to the customer may occur at the store. Such stores may be located in different territories, cities, or counties. For example, when the stores are located in Canada, sales of the items to U.S. customers may occur substantially or entirely through the Internet, and sales of the items to Canadian customers may occur substantially or entirely at the stores.

Nevertheless, after the pharmaceutical companies sell the items to the stores, the pharmaceutical companies may not be able to determine the percentage of the items which the consumers purchase from the stores through the Internet, and/or the percentage of the items which the consumers purchase at the stores. Such information may assist the pharmaceutical companies in determining where to store their inventory, and/or projecting future sales. Therefore, a need has arisen for a technique for estimating sales of items which overcome these and other shortcomings of the related art.

SUMMARY OF THE INVENTION

An object of the present invention is to estimate sales of items by one or more entities through a first channel, such as the Internet, versus sales of the items by the one or more entities through a second channel, such as at a store.

In order to meet these objectives and others that will become apparent with reference to the disclosure below, the present invention provides techniques for estimating sales of one or more types of items by one or more first entities through a first channel versus sales of the one or more types of items by the one or more first entities through a second channel. For example, the one or more first entities may be a store which purchases the items from a manufacturer/producer of the items, and then sells the items which they purchased to a customer/end user. The manufacturer/producer of the one or more types of items may be a pharmaceutical company, and the one or more types of items may be different types of prescription drugs.

According to a preferred embodiment of the present invention, a method is provided to estimate a particular point of time, such as a day or a month, corresponding to when the one or more first entities initially sold the one or more types of item through the first channel. For example, the first channel may correspond to sales made through the Internet, sales made to customers residing in a particular location, such as a particular country, or both. One or more second entities which sell the one or more types of item also is selected. Specifically, each sale of the one or more types of items by the one or more second entities may be through the second channel. For example, the one or more second entities may not sell the one or more types of items through the Internet, may not sell the one or more types of items in the particular country, or both. The size and the location of the one or more second entities also may be substantially similar to the size and location of the one or more first entities.

Data associated with sales of the one or more types of items by the one or more first entities before the occurrence of the particular point time is also compared with data associated with sales of the one or more types of items by the one or more second entities before the occurrence of the particular point time to determine an adjustment factor. Data associated with sales of the one or more types of items by the one or more second entities after the occurrence of the particular point time then may be altered based on the adjustment factor to obtain altered sales data.

Moreover, data associated with sales of the one or more types of items by the one or more first entities after the occurrence of the particular point time may be compared with the altered sales data to obtain an estimation of sales of the one or more types of items by the one or more first entities through the first channel versus sales of the one or more types of items by the one or more first entities through the second channel.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIGS. 4a-4b are flow-charts of methods for analyzing those portions of the sales data which were selected in the method of FIG. 3, according to embodiments of the present invention.

FIGS. 5a-5b are flow-charts of methods for estimating the particular point of time based on the analysis performed in the methods of FIG. 4a-4b, respectively, according to embodiments of the present invention.

FIGS. 6a-6b are charts used to estimate the particular point of time each predetermined period of time is divided into three portions, according to an exemplary embodiment of the present invention.

FIG. 7 is a block diagram of a system for estimating sales of items by an entity through a first channel versus sales of the items by the entity through a second channel, according to an embodiment of the present invention.

In FIGS. 1-7, like numerals are used for like corresponding parts in the various drawings.

DETAILED DESCRIPTION OF PRESENTLY PREFERRED EMBODIMENTS

Figure 1:
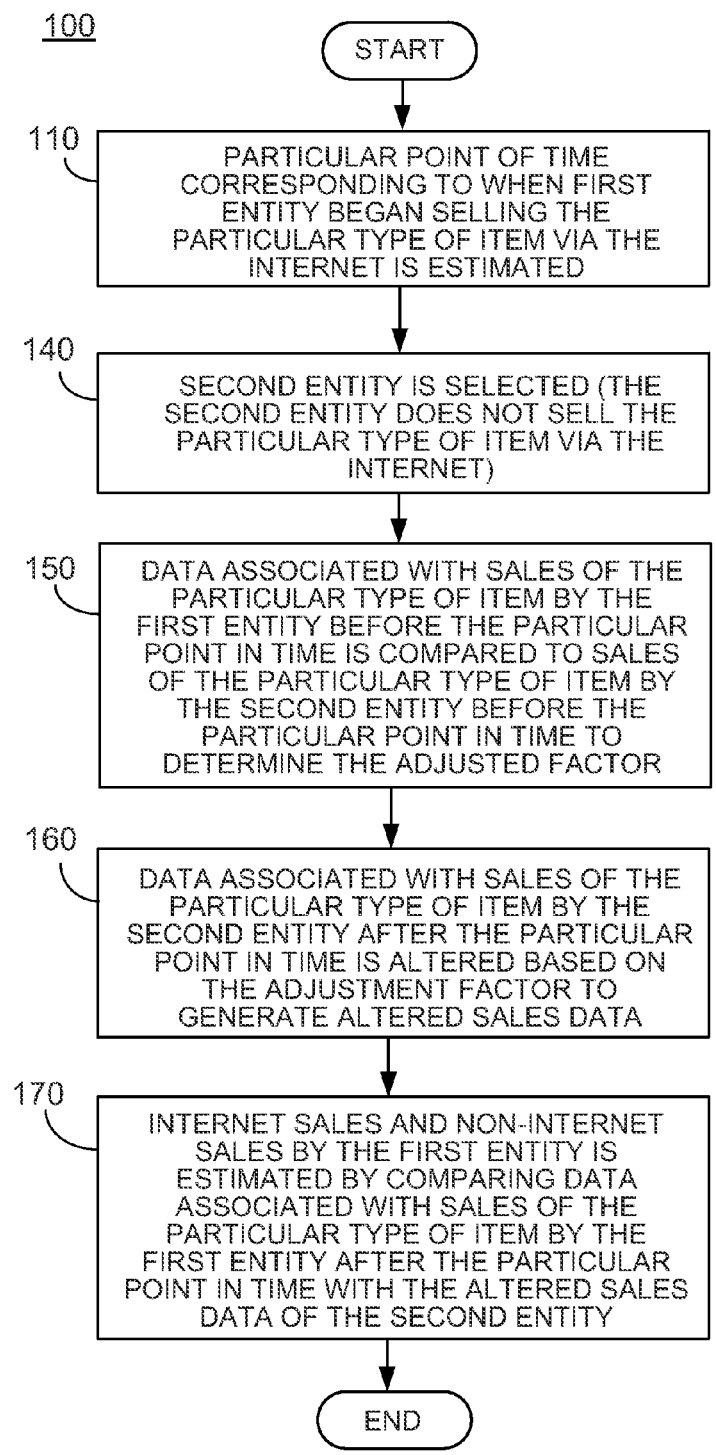
FIG. 1 is a flow-chart of a method for estimating sales of items by an entity through a first channel versus sales of the items by the entity through a second channel, according to an embodiment of the present invention.

FIG. 1 depicts a method 100 for estimating sales of items by at least one first entity through a first channel versus sales of the items by the at least one first entity through a second channel, according to an embodiment of the present invention. For example, the at least one first entity may be a store which purchases the items from a manufacturer/producer of the items, and then sells the items which they purchased to a customer/end user. The manufacturer/producer of the items may be a pharmaceutical company, the store may be a pharmacy or a prescription drug wholesaler, and the one or more types of items may be different types of prescription drugs.

Moreover, the first channel may correspond to sales of the items through the Internet, sales of the items to customers residing in a particular location, such as a particular country, or both. The second channel may correspond to sales of the items occurring through a channel allowing a representative of the first entity assist the customer in their purchase of the items. For example, the second channel may correspond to in-store sales. Method 100 includes steps 110, 140, 150, 160, and 170.

In step 110, a particular point in time corresponding to when the at least one first entity began selling the items through the first channel may be estimated. For example, the particular point in time may correspond to a particular day on which the first entity began selling the items through the first channel, or a particular month during which the first entity began selling the items through the first channel.

Figure 2:
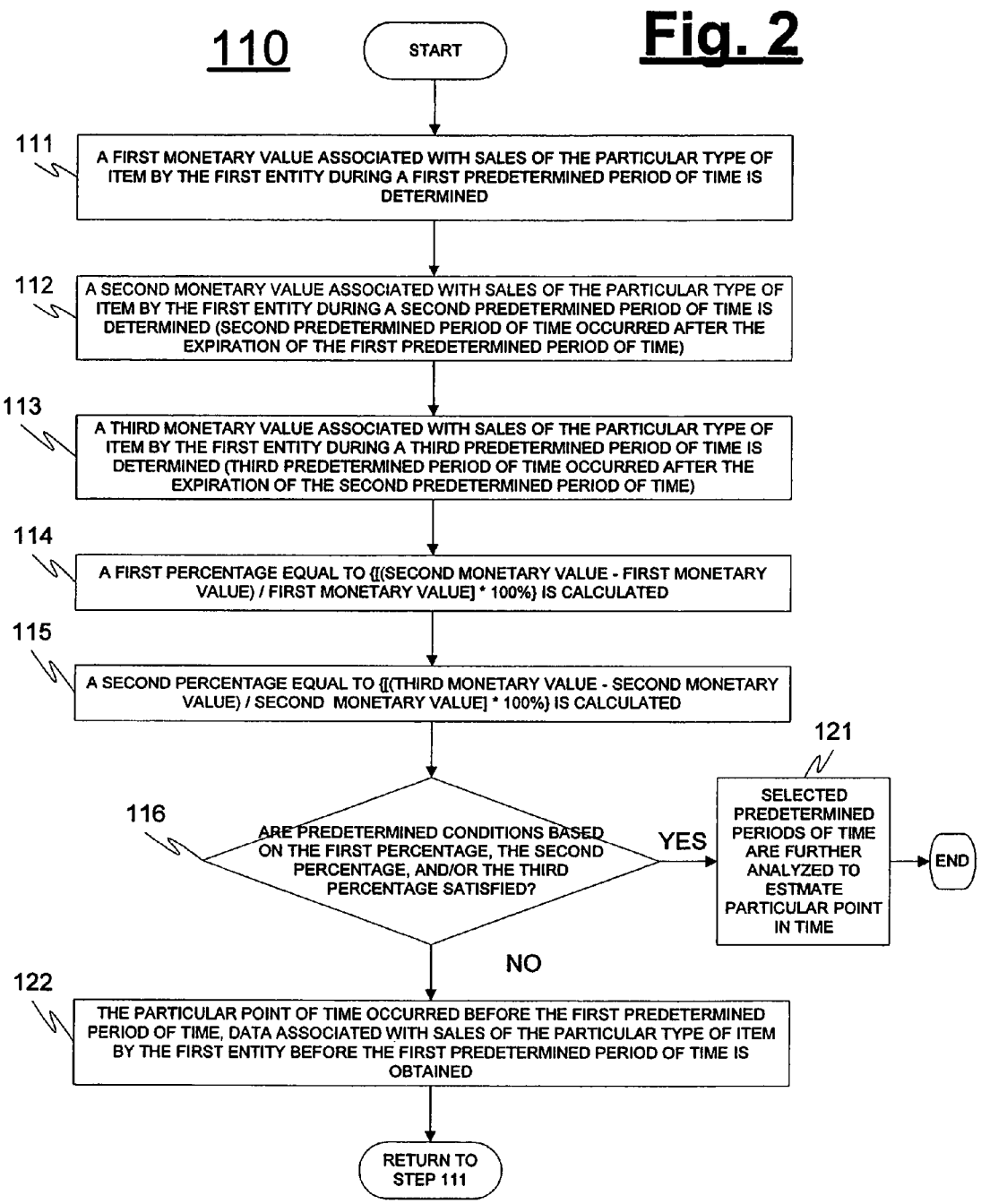
FIG. 2 is a flow-chart of a method for estimating a particular point of time, such as a day or a month, corresponding to when the entity initially sold the one or more types of item through the first channel, according to an embodiment of the present invention.

FIG. 2 depicts a method for estimating the particular point in time, according to an embodiment of the present invention. In step 111, a first monetary value associated with sales of the items by the first entity during a first predetermined period of time may be determined. For example, the first predetermined period of time may correspond to January of a particular year through March of the particular year. The first monetary value may be the average monthly value of the sales of the items between January of the particular year and March of the particular year.

In step 112, a second monetary value associated with sales of the items by the first entity during a second predetermined period of time may be determined. For example, the second predetermined period of time may correspond to April of the particular year through June of the particular year. The second monetary value may be the average monthly value of the sales of the items between April of the particular year and June of the particular year. In this example, the second predetermined period of time occurred after the expiration of the first predetermined period of time, and the first predetermined period of time and the second predetermined period of time are consecutive periods of time.

In step 113, a third monetary value associated with sales of the items by the first entity during a third predetermined period of time may be determined. For example, the third predetermined period of time may correspond to July of the particular year through September of the particular year. The third monetary value may be the average monthly value of the sales of the items between July of the particular year and September of the particular year. In this example, the third predetermined period of time occurred after the expiration of the second predetermined period of time, and the second predetermined period of time and the third predetermined period of time are consecutive periods of time.

In a preferred embodiment of the present invention, in step 113, a monetary value associated with sales of the items by the first entity during a fourth predetermined period of time may be determined. For example, the fourth predetermined period of time may correspond to October of the particular year through December of the particular year. In this embodiment, the particular point in time may be estimated based on sales data accumulated during a single calendar year. Nevertheless, it will be readily understood by those of ordinary skill in the art that step 110 may use any number of predetermined periods of time.

In step 114, a first percentage may be calculated. In this embodiment of the present invention, the first percentage may equal $\{[(B-A)/A]*100\%\}$, where A is the first monetary value, and B is the second monetary value. For example, referring to FIG. 6a, when the first monetary value is 17,000 units and the second monetary value is 18,500 units, the first percentage is about 8.8%. In step 115, a second percentage may be calculated. In this embodiment of the present invention, the second percentage may equal $\{[(C-B)/B]*100\%\}$, where B is the second monetary value, and C is the third monetary value. For example, referring to FIG. 6a, when the second monetary value is 18,500 units and the third monetary value is 86,832 units, the second percentage is about 369.4%. In a preferred embodiment of the present invention, a percentage difference between the third monetary value and the fourth monetary value may be determined in a similar manner.

Figure 3:
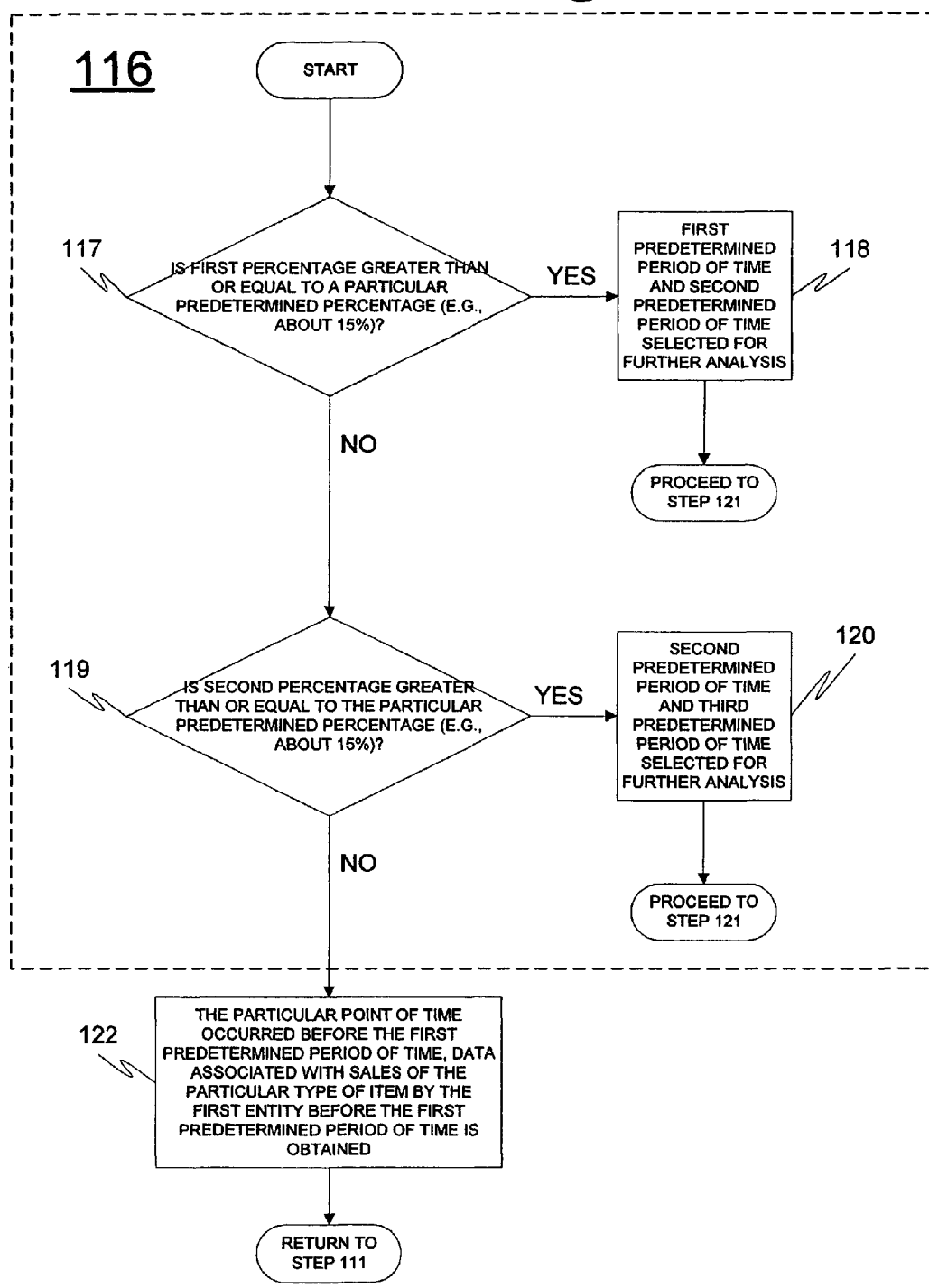
FIG. 3 is a flow-chart of a method for determining whether predetermined conditions used to estimate the particular point of time are satisfied, and for selecting which portions of sales data will be further analyzed to estimate the particular point of time, according to an embodiment of the present invention.

In step 116, the first percentage and the second percentage may be analyzed to determine whether at least one predetermined condition is satisfied. FIG. 3 depicts a method for determining whether the at least one predetermined condition is satisfied. In step 117, the first percentage may be analyzed to the determine whether the first percentage is greater than or equal to a particular predetermined percentage, such as about 15%. If the first percentage is greater than or equal to the particular predetermined percentage, then in step 118, the first predetermined period of time and the second predetermined period of time are selected for further analysis. Specifically, when the first percentage is greater than or equal to the particular predetermined percentage, the particular point in time occurred or likely occurred during the first predetermined period of time or the second predetermined period of time. The method then proceeds to step 121.

If, however, the first percentage is less than the particular predetermined percentage, then in step 119, the second percentage may be analyzed to the determine whether the second percentage is greater than or equal to the particular predetermined percentage, such as about 15%. If the second percentage is greater than or equal to the particular predetermined percentage, then in step 120, the second predetermined period of time and the third predetermined period of time are selected for further analysis. Specifically, when the second percentage is greater than or equal to the particular predetermined percentage, the particular point in time occurred or likely occurred during the second predetermined period of time or the third predetermined period of time. The method then proceeds to step 121.

If, however, the first percentage and the second percentage are less than the particular predetermined percentage, and there are no predetermined periods of time which occurred after the expiration of the third predetermined period of time, then the particular point of time occurred or likely occurred before the first predetermined period of time. Consequently, in step 122, the method returns to step 111, and monetary values associated with predetermined periods of time which occurred before the first predetermined period of time may be determined.

When in step 118 the first predetermined period of time and the second predetermined period of time are selected for further analysis, or when in step 120 the second predetermined period of time and the third predetermined period of time are selected for further analysis, the method proceeds to step 121. Referring to FIG. 2, in step 121, the selected predetermined periods of time may be further analyzed to estimate the particular point in time.

FIGS. 4*a*-4*b* depict methods for analyzing sales data associated with sales of the items during the selected predetermined periods of time, according to an exemplary embodiment of the present invention. Referring to FIG. 4*a*, in step 123, it is determined whether the selected predetermined periods of time were the first predetermined period of time and the second predetermined period of time. If the selected predetermined periods of time were the first predetermined period of time and the second predetermined period of time, then in step 124, a fourth monetary value associated with sales of the items by the first entity during a first portion of the first predetermined period of time may be determined. For example, the first portion of the first predetermined period of time may correspond to sales of the items which occurred in January of the particular year.

In step 125, a fifth monetary value associated with sales of the items by the first entity during a second portion of the first predetermined period of time may be determined. For example, the second portion of the first predetermined period of time may correspond to sales of the items which occurred in February of the particular year. In a preferred embodiment of the present invention, in step 125, a monetary value associated with sales of the items by the first entity during a third portion of the first predetermined period of time may be determined. For example, the third portion of the first predetermined period of time may correspond to sales of the items which occurred in March of the particular year.

In step 126, a sixth monetary value associated with sales of the items by the first entity during a first portion of the second predetermined period of time may be determined. For example, the first portion of the second predetermined period of time may correspond to sales of the items which occurred in April of the particular year.

In step 127, a seventh monetary value associated with sales of the items by the first entity during a second portion of the second predetermined period of time may be determined. For example, the second portion of the second predetermined period of time may correspond to sales of the items which occurred in May of the particular year. In a preferred embodiment of the present invention, in step 127, a monetary value associated with sales of the items by the first entity during a third portion of the second predetermined period of time may be determined. For example, the third portion of the second predetermined period of time may correspond to sales of the items which occurred in June of the particular year.

In step 128, a third percentage may be calculated. In this embodiment of the present invention, the third percentage may equal $\{[(E-D)/E]*100\%\}$, where D is the fourth monetary value, and E is the fifth monetary value. For example, referring to FIG. 6*b*, when the fourth monetary value is 18,000 units and the fifth monetary value is 19,500 units, the third percentage is about 7.7%. The method used to calculate the third percentage may be different than the method used to calculate the first percentage and the second percentage to account for fluctuations which may occur between two consecutive months. If the method used to calculate the third percentage were the same as the method used to calculate the first percentage and the second percentage, such fluctuations may result in the selection of an incorrect particular point in time.

In step 129, a fourth percentage may be calculated. In this embodiment of the present invention, each predetermined period of time is divided into two portions, and the fourth percentage may equal $\{[(F-E)/F]*100\%\}$, where E is the fifth monetary value, and F is the sixth monetary value. Nevertheless, it will be readily understood by those of ordinary skill in the art that the formula used to calculate the fourth percentage may vary depending on the number portions into which each predetermined period of time is divided. For example, when each predetermined period of time is divided into three portions, the fourth percentage depends on the monetary values associated with the second portion of the first predetermine period of time and the third portion of the first predetermined period of time. In contrast, when each predetermined period of time is divided into two portions, the fourth percentage depends on the monetary values associated with the second portion of the first predetermine period of time and the first portion of the second predetermined period of time.

In step 130, a fifth percentage may be calculated. In this embodiment of the present invention, each predetermined period of time is divided into two portions, and the fifth percentage may equal $\{[(G-F)/G]*100\%\}$, where F is the sixth monetary value, and G is the seventh monetary value. Moreover, in step 131, the particular point in time corresponding to when the first entity began selling the items through the first channel may be estimated based on the third, fourth, and/or fifth percentages.

FIGS. 4*a*-4*b* are substantially the same, except that FIG. 4*a* corresponds to when the first predetermined period time and the second predetermined period of time are selected for further analysis, and FIG. 4*b* corresponds to when the second predetermined period time and the third predetermined period of time are selected for further analysis. Therefore, FIG. 4*b* is not discussed further in the present application.

Figure 5A:
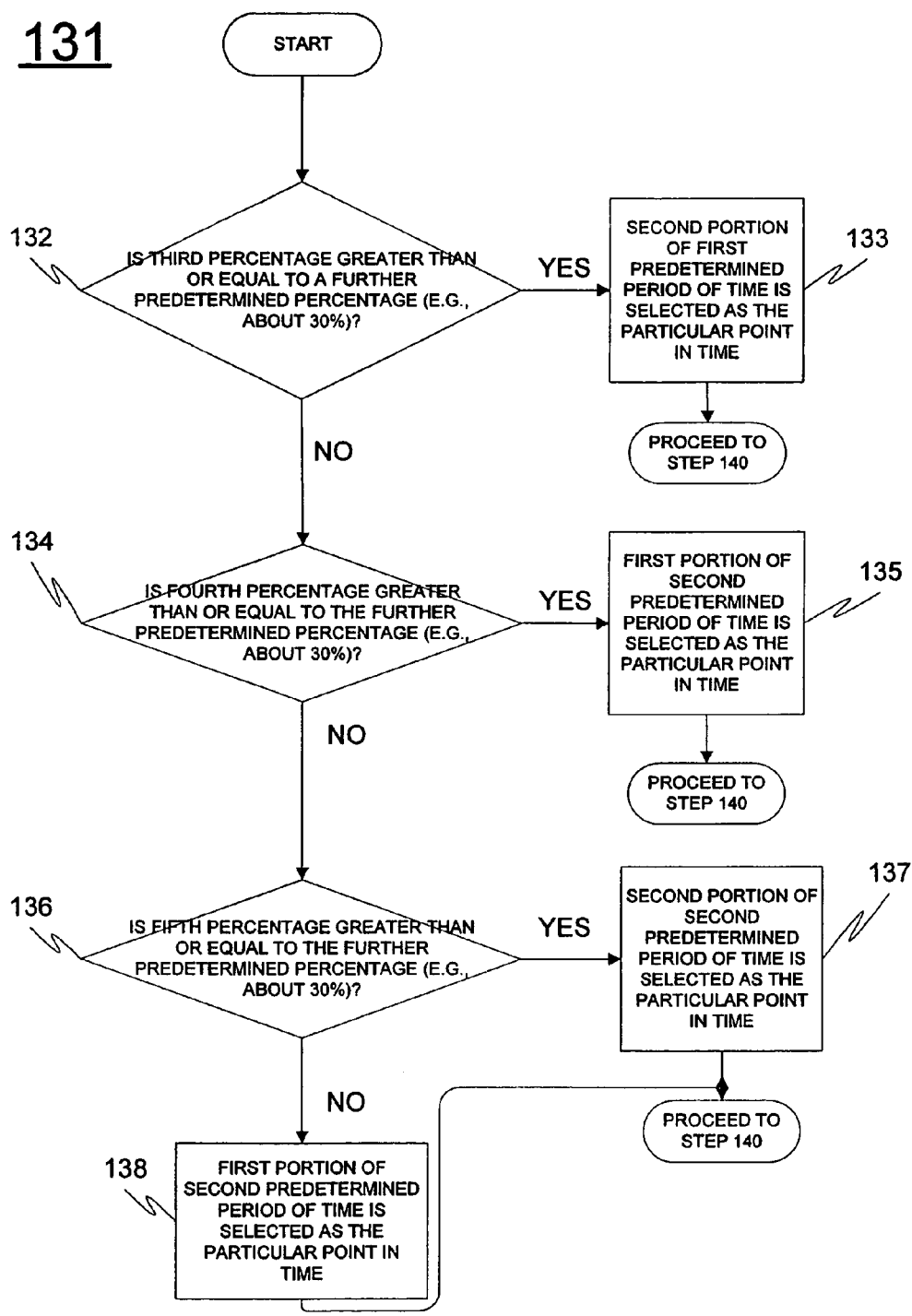

FIGS. 5*a*-5*b* depict methods for estimating the particular point in time based on the third, fourth, and/or a fifth percentage, in which each predetermined period of time was divided into two portions. Nevertheless, it will be readily understood by those of ordinary skill in the art that the methods depicted in FIGS. 5*a*-5*b* may vary depending on the number portions into which each predetermined period of time is divided. Referring to FIG. 5*a*, in step 132, the third percentage may be analyzed to the determine whether the third percentage is greater than or equal to a further predetermined percentage, such as about 30%. If the third percentage is greater than or equal to the further predetermined percentage, then in step 133, the second portion of the first predetermined period of time is selected as the particular point in time. Specifically, when the third percentage is greater than or equal to the further predetermined percentage, the particular point in time occurred or likely occurred during the second portion of the first predetermined period of time. The method then proceeds to step 140.

If, however, the third percentage is less than the further predetermined percentage, then in step 134, the fourth percentage may be analyzed to the determine whether the fourth percentage is greater than or equal to the further predetermined percentage, such as about 30%. If the fourth percentage is greater than or equal to the further predetermined percentage, then in step 135, the first portion of the second predetermined period of time is selected as the particular point in time. Specifically, when the fourth percentage is greater than or equal to the further predetermined percentage, the particular point in time occurred or likely occurred during the first portion of the second predetermined period of time. The method then proceeds to step 140.

Similarly, if the fourth percentage is less than the further predetermined percentage, then in step 136, the fifth percentage may be analyzed to the determine whether the fifth percentage is greater than or equal to the further predetermined percentage, such as about 30%. If the fifth percentage is greater than or equal to the further predetermined percentage, then in step 137, the second portion of the second predetermined period of time is selected as the particular point in time. Specifically, when the fifth percentage is greater than or equal to the further predetermined percentage, the particular point in time occurred or likely occurred during the second portion of the second predetermined period of time. The method then proceeds to step 140.

If, however, the third percentage, the fourth percentage, and the fifth percentage are less than the further predetermined percentage, then in step 138, the first portion of the predetermined period of time which most recently occurred may be selected as the particular point in time. For example, in this embodiment of the present invention, the first portion of the second predetermined period of time may be selected as the particular point in time. The method then proceeds to step 140.

FIGS. 5a-5b are substantially the same, except that FIG. 5a corresponds to when the first predetermined period time and the second predetermined period of time were selected for further analysis, and FIG. 5b corresponds to when the second predetermined period time and the third predetermined period of time were selected for further analysis. Therefore, FIG. 4b is not discussed further in the present application.

Referring again to FIG. 1, after the particular point in time is selected, in step 140, at least one second entity may be selected for comparison with the at least one first entity. The second entity may be an entity which is similar to the first entity. For example, the size and the location of the second entity may be substantially similar to the size and the location of the first entity. Also, each of the sales of the items by the second entity may be through the second channel. For example, the second entity may not sell the items through the Internet.

In step 150, data associated with sales of the items by the first entity which occurred before the particular point in time may be compared to sales of the items by the second entity which occurred before the particular point in time to determine an adjustment factor. For example, the monetary value of sales of the items by the first entity during the six-month period immediately preceding the particular point in time may be compared to the monetary value of sales of the items by the second entity during the six-month period immediately preceding the particular point in time.

The adjustment factor may equal (H/I), where H is the monetary value associated with the first entity's sales before the particular point in time, and I is the monetary value associated with the second entity's sales before the particular point in time. For example, if the particular point in time is July of the particular year, and the monetary value of the first entity's sales between January and July of the particular year are two times greater than the second entity's sales between January and July of the particular year, then the adjustment factor may be equal to about two.

In a preferred embodiment of the present invention, the adjustment factor may equal (H/I), where H is the monetary value associated with the first entity's sales for a product before the particular point in time, and I is the monetary value associated with the second entity's sales for the product before the particular point in time. For example, if the particular point in time is July of the particular year, and the monetary value of the first entity's sales for a product between January and July of the particular year is two times greater than the second entity's sales for the product between January and July of the particular year, then the adjustment factor may be equal to about two.

In another embodiment of the present invention, when the first entity began selling the items less than a preselected amount of time, such as about three months, before the particular point in time, the adjustment factor may be set equal to about one. When the first entity began selling the items more than a preselected amount of time, such as about six months, before the particular point in time, the adjustment factor may be determined from the sales data recorded during the six-month period immediately preceding the particular point in time.

In step 160, data associated with sales of the items by the second entity after the particular point in time may be altered based on the adjustment factor to obtain altered sales data for the second entity. For example, if the particular point in time is July of the particular year, and the adjustment factor is two, the monetary value of the sales of the items by the second entity between July and December of the particular year may be doubled. Moreover, the estimated monetary value of sales of the items by the first entity through the second channel between July and December of the particular year may be equal to the monetary value associated with the altered sales data of the second entity.

Specifically, in method 100, it is assumed that had the first entity not began selling the items through the first channel at the particular point in time, then the ratio between the monetary value associated with the sales of the items by the first entity and the monetary value associated with the sales of the items by the second entity would remain substantially constant. It also is assumed that any increase between the above-described ratio may be attributed to the first entity's sales of the items through the first channel. Consequently, in step 170, the monetary value of the first entity's sales of the items through the first channel may be estimated based on the altered sales data of the second entity and the total monetary value of the first entity's sales of the items after the particular point in time. For example, the monetary value of the first entity's sales of the items through the first channel may be estimated by subtracting the monetary value associated with the altered sales data of the second entity from the total monetary value of the first entity's sales of the items after the particular point in time.

In a preferred embodiment, in step 170, the monetary value of the first entity's sales for an item through the first channel may be estimated based on the altered sales data for the item of the second entity and the total monetary value of the first entity's sales for the item after the particular point in time. For example, the monetary value of the first entity's sales for an item through the first channel may be estimated by subtracting the monetary value associated with the altered sales data for the item of the second entity from the total monetary value of the first entity's sales for the item after the particular point in time. If the second entity does not have sales data for the item, then the monetary value associated with the altered sales data for the item of the second entity is about 0.

FIG. 7 depicts a system 700 for estimating sales of items by the first entity through the first channel versus sales of the items by the first entity through the second channel, according to an embodiment of the present invention. System 700 may include a storage device 730 (e.g., RAM, hard drive, CD-ROM, etc.) that stores a software arrangement 710, and has a processing system 720 (e.g., a microprocessor). Software arrangement 710 may be executed by processing system 720 to estimate sales of items by the first entity through the first channel versus sales of the items by the first entity through the second channel in accordance with the above-described embodiments of the present invention.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A method for estimating sales of a type of item by a first entity through a first commercial channel versus sales of the item by the first entity through a second commercial channel, comprising:
    estimating a particular point of time corresponding to when the first entity initially began selling the type of item through the first commercial channel, wherein estimating the particular point of time includes:
        determining a plurality of monetary values associated with sales of the type of item through all available commercial channels by the first entity, each of the plurality of monetary values representing sales of the type of item during one of a plurality of consecutive periods of time,
        comparing differences between the plurality of monetary values,
        based on the comparison of the differences between the plurality of monetary values, selecting one of the plurality of consecutive periods of time, and
        estimating that the particular point of time corresponding to when the first entity initially sold the type of item through the first commercial channel occurred during the selected one of the plurality of consecutive periods of time,
    selecting a second entity which sells the type of item, wherein each sale of the type of item by the second entity is through the second commercial channel;
    comparing, using a processing system, data associated with sales of the type of item by the first entity before the occurrence of the particular point of time with data associated with sales of the type of item by the second entity before the occurrence of the particular point of time to determine an adjustment factor;
    altering data associated with sales of the type of item by the second entity after the occurrence of the particular point of time based on the adjustment factor to obtain altered sales data; and
    comparing data associated with sales of the type of item by the first entity after the occurrence of the particular point of time with the altered sales data to obtain an estimation of sales of the type of item by the first entity through the first commercial channel.

2. The method of claim 1, wherein estimating the particular point of time includes:
    determining a first monetary value associated with sales of the type of item by the first entity during a first predetermined period of time;
    determining a second monetary value associated with sales of the type of item by the first entity during a second predetermined period of time, wherein the second predetermined period of time occurred after the first predetermined period of time;
    determining a third monetary value associated with sales of the type of item by the first entity during a third predetermined period of time, wherein the third predetermined period of time occurred after the second predetermined period of time;
    calculating a first percentage, wherein the first percentage equals $\{[(B-A)/A]*100\%\}$, where A is the first monetary value and B is the second monetary value;
    calculating a second percentage, wherein the second percentage equals $\{[(C-B)/B]*100\%\}$, where B is the second monetary value and C is the third monetary value;
    selecting the first predetermined period time and the second predetermined period of time when the first percentage is greater than or equal to a particular predetermined percentage; and
    selecting the second predetermined period time and the third predetermined period of time when:
        the first percentage is less than the particular predetermined percentage; and
        the second percentage is greater than or equal to the particular predetermined percentage.

3. The method of claim 2, wherein selecting the first predetermined period time and the second predetermined period of time includes:
    determining a fourth monetary value associated with sales of the type of item by the first entity during a first portion of the first predetermined period of time;
    determining a fifth monetary value associated with sales of the type of item by the first entity during a second portion of the first predetermined period of time, wherein the second portion of the first predetermined period of time occurred after the first portion of the first predetermined period of time;
    determining a sixth monetary value associated with sales of the type of item by the first entity during a first portion of the second predetermined period of time;
    determining a seventh monetary value associated with sales of the type of item by the first entity during a second portion of the second predetermined period of time, wherein the second portion of the second predetermined period of time occurred after the first portion of the second predetermined period of time;
    calculating a third percentage, wherein the third percentage equals $\{[(E-D)/E]*100\%\}$, where D is the fourth monetary value and E is the fifth monetary value;
    calculating a fourth percentage, wherein the fourth percentage equals $\{[(F-E)/F]*100\%\}$, where E is the fifth monetary value and F is the sixth monetary value;
    calculating a fifth percentage, wherein the fifth percentage equals $\{[(G-F)/G]*100\%\}$, where G is the sixth monetary value and F is the seventh monetary value;
    selecting the second portion of the first predetermined period of time as the particular point of time when the third percentage is greater than or equal to a further predetermined percentage;
    selecting the first portion of the second predetermined period of time as the particular point of time when:
        the third percentage is less than the further predetermined percentage; and
        the fourth percentage is greater than or equal to the further predetermined percentage; and
    selecting the second portion of the second predetermined period of time as the particular point of time when:
        each of the third and fourth percentages is less than the further predetermined percentage; and
        the fifth percentage is greater than or equal to the further predetermined percentage.

4. The method of claim 3, further comprising selecting the first portion of the second predetermined period of time as the particular point of time when each of the third, fourth, and fifth percentages is less than the further predetermined percentage.

5. The method of claim 3, wherein the particular predetermined percentage is 15%, and the further predetermined percentage is about 30%.

6. The method of claim 1, wherein the adjustment factor equals (H/I), where H corresponds to the data associated with the sales of the type of item by the first entity before the occurrence of the particular point of time, and I corresponds to the data associated with the sales of the type of item by the second entity before the occurrence of the particular point of time.

7. The method of claim 6, wherein the altered sales data equals (J*K), where J corresponds to the sales of the type of item by the second entity after the occurrence of the particular point of time, and K is the adjustment factor.

8. The method of claim 7, wherein the estimation of sales of the type of item by the first entity through the first commercial channel equals (L−M), where L corresponds to the sales of the type of item by the first entity after the occurrence of the particular point of time, and M is the altered sales data.

9. The method of claim 1, wherein the first commercial channel corresponds to internet sales, the second commercial channel corresponds to non-internet sales, and the first entity is a store which initially purchased the type of item from a pharmaceutical company.

10. The method of claim 1, wherein the first commercial channel corresponds to sales of the type of item to residents of a first country, and the second commercial channel corresponds to sales of the type of item to residents of a second country.

11. The method of claim 1, wherein the first commercial channel is the Internet, and the second entity does not sell the type of item through the Internet.

12. A system for estimating sales of a type of item by a first entity through a first commercial channel versus sales of the type of item by the first entity through a commercial second channel, wherein the system comprises:
　a storage device for storing information associated with sales of the type of item; and
　a processor coupled to the storage device, wherein the processor is operable to:
　　estimate a particular point of time corresponding to when the first entity initially began selling the type of item through the first commercial channel, wherein the processor is operable to estimate the particular point of time by:
　　　determining a plurality of monetary values associated with sales of the type of item through all available commercial channels by the first entity, each of the plurality of monetary values representing sales of the type of item during one of a plurality of consecutive periods of time,
　　　comparing differences between the plurality of monetary values,
　　　based on the comparison of the differences between the plurality of monetary values, selecting one of the plurality of consecutive periods of time, and
　　　estimating that the particular point of time corresponding to when the first entity initially sold the type of item through the first commercial channel occurred during the selected one of the plurality of consecutive periods of time,
　　select a second entity which sells the type of item, wherein each sale of the type of item by the second entity is through the second commercial channel;
　　compare, using a processing system, data associated with sales of the type of item by the first entity before the occurrence of the particular point of time with data associated with sales of the type of item by the second entity before the occurrence of the particular point of time to determine an adjustment factor;
　　alter data associated with sales of the type of item by the second entity after the occurrence of the particular point of time based on the adjustment factor to obtain altered sales data; and
　　compare data associated with sales of the type of item by the first entity after the occurrence of the particular point of time with the altered sales data to obtain an estimation of sales of the type of item by the first entity through the first commercial channel.

13. The system of claim 12, wherein the adjustment factor equals (H/I), where H corresponds to the data associated with the sales of the type of item by the first entity before the occurrence of the particular point of time, and I corresponds to the data associated with the sales of the type of item by the second entity before the occurrence of the particular point of time.

14. The system of claim 13, wherein the altered sales data equals (J*K), where J corresponds to the sales of the type of item by the second entity after the occurrence of the particular point of time, and K is the adjustment factor.

15. The system of claim 14, wherein the estimation of sales of the type of item by the first entity through the first commercial channel equals (L−M), where L corresponds to the sales of the type of item by the first entity after the occurrence of the particular point of time, and M is the altered sales data.

16. The system of claim 12, wherein the first commercial channel corresponds to internet sales, and the second commercial channel corresponds to non-internet sales.

17. A storage device having a software arrangement stored thereon, that when executed, causes a processing system to perform operations comprising:
　estimating a particular point of time corresponding to when the first entity initially began selling the type of item through the first commercial channel, wherein estimating the particular point of time includes:
　　determining a plurality of monetary values associated with sales of the type of item through all available commercial channels by the first entity, each of the plurality of monetary values representing sales of the type of item during one of a plurality of consecutive periods of time,
　　comparing differences between the plurality of monetary values,
　　based on the comparison of the differences between the plurality of monetary values, selecting one of the plurality of consecutive periods of time, and
　　estimating that the particular point of time corresponding to when the first entity initially sold the type of item through the first commercial channel occurred during the selected one of the plurality of consecutive periods of time,
　selecting a second entity which sells the type of item, wherein each sale of the type of item by the second entity is through the second commercial channel;
　comparing, using a processing system, data associated with sales of the type of item by the first entity before the occurrence of the particular point of time with data associated with sales of the type of item by the second entity before the occurrence of the particular point of time to determine an adjustment factor;
　altering data associated with sales of the type of item by the second entity after the occurrence of the particular point of time based on the adjustment factor to obtain altered sales data; and
　comparing data associated with sales of the type of item by the first entity after the occurrence of the particular point of time with the altered sales data to obtain an estimation of sales of the type of item by the first entity through the first commercial channel.

\* \* \* \* \*